July 16, 1935.  J. H. SHARP  2,008,229
BOLT
Filed Aug. 11, 1932
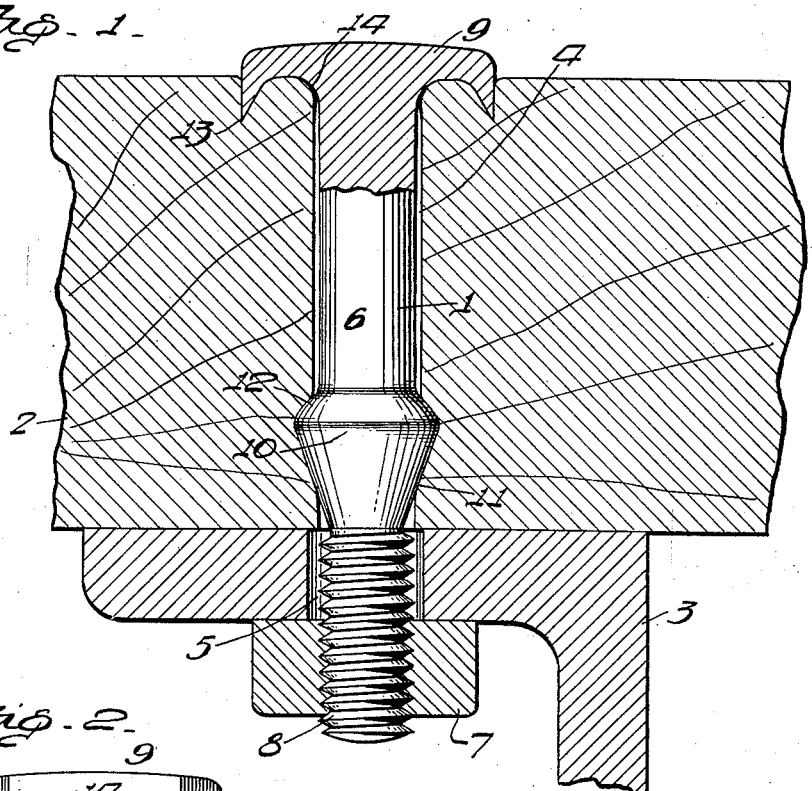
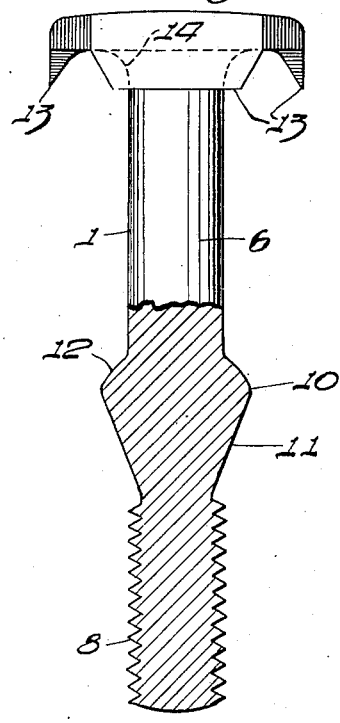
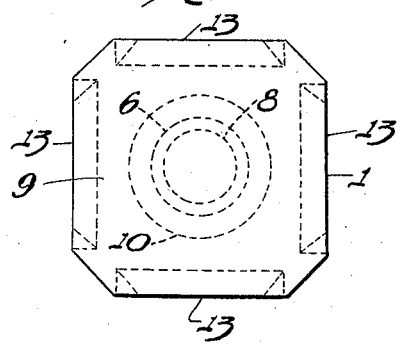
INVENTOR
John H. Sharp
BY Towson Price
ATTORNEY Patented July 16, 1935

2,008,229

UNITED STATES PATENT OFFICE 2,008,229

BOLT

John H. Sharp, Chicago, Ill.

Application August 11, 1932, Serial No. 628,392

11 Claims. (Cl. 85—1)

This invention relates to bolts and, more particularly, to such formed for sealing the bolt-receiving aperture in an associated wooden member.

The principal object of my invention, generally considered, is the provision of bolts particularly adapted for use in wood and each provided with an enlarged portion or annular bulge which may be spaced from the head and which is adapted to seal the bolt-receiving hole in the wood.

Another object of my invention is the provision of a bolt adapted for use in wood and which, when in position, securely closes or seals both ends of the hole in the wood.

A further object of my invention is the provision of a bolt which is preferably formed with a straight or cylindrical shank having an approximately flat head and a fillet adjacent said head adapted to set up wedge action and seal the bolt-hole adjacent said head, a portion of the bolt shank spaced from said head, and preferably at or near the point where the bolt shank emerges from the wood, being formed with a sealing bulge or pressure portion adapted to seal the other end of said bolt-hole.

A still further object of my invention is the provision of a bolt of the character heretofore described and provided with a multi-sided head formed with means for preventing turning of the bolt when in place, said means preferably comprising a plurality of cutting spurs extending approximately axially of the bolt shank.

Other objects and advantages of the invention relating to the particular arrangement and construction of the various parts will become apparent as the description proceeds.

Referring to the drawing illustrating my invention:—

Fig. 1 is a fragmentary view, partly in transverse section, of a wooden member or sheathing and an associated metal frame portion, with a preferred form of my bolt shown partly in side elevation and partly in longitudinal section used for connecting said wood and metal parts.

Figure 2 is a side elevation of the form of bolt shown in Figure 1 removed from the parts which it serves to connect and shown partly in longitudinal section.

Figure 3 is a head end view of the bolt shown in Figures 1 and 2.

In all structures where wooden parts are bolted into position, trouble and expense are experienced in service due to the fact that common bolt shanks do not and cannot entirely fill and seal the bolt-hole. This is due to several causes, as follows:—

First, the materials from which bolts of the same nominal diameters are made vary in diameter sufficiently to prevent a uniform fit in bolt-holes of the same diameter.

Second, seams in the material forming the shank of the bolt, break down of the scale on the surface of the bolt-hole, and the formation of bolt shanks not accurately cylindrical all prevent uniform fit.

Third, even if bolts were uniform in shank diameter, it would be impossible to get a uniform fit in bolt-holes in wood because any inequality in the size of the drill or bit used in boring the wood varies the size of the bolt-holes, and minor variations in sharpening such drills or bits, as well as the position in which the workman holds his tool while boring, affect both the diameter and shape of the hole.

Fourth, even though the above insurmountable difficulties were overcome, the shrinkage of warping of the wood after the bolt is in position results in the wood drawing away from the bolt shank leaving voids.

Such voids or spaces between the wood and bolt shank, which are unavoidable for the reasons cited, permit moisture to follow the bolt shank into the wood, causing leaks or trapping the moisture in the bolt-hole and rotting the lumber.

In accordance with my invention, I provide means for permanently sealing the bolt-hole against the entrance of moisture. This is accomplished by gradually enlarging the shank to a greater diameter toward the head or through the use of a pressure sealing member or bulge formed on the bolt shank at any desired point, but preferably spaced from the head and disposed where the shank emerges from the wood, or adjacent the end of the hole in the wood opposite to the head of the bolt. This enlargement or sealing bulge is formed so as to exert a gradually increasing pressure as it is forced into the bolt hole, thus avoiding a splitting, rending shock, but setting up a gradual pressure between the surface of the bulge and the wood surrounding the bolt-hole.

The size and shape of the enlargement or sealing bulge can be varied to meet service conditions, such as variation in shrinkage of different kinds or grades of lumber. In actual use, the sealing bulge will eliminate all voids due to variations in sizes of bolt shank or bolt-holes and put the wood fibers around each bolt-hole under pressure that will not permit breaking the seal even with the maximum shrinkage of the wood, because as shrinkage occurs, the action of the wood fibers in tending to resume their normal position maintains full contact at all points on the surface of the bulge and insures a moisture-proof seal at all times.

Referring to the drawing in detail, like parts being designated by like reference characters, there is shown a bolt 1, which, in Fig. 1, is represented as connecting a wooden member 2 and a metal member 3, as by extending through registering apertures 4 in the wood member and 5 in the metal member. The end of the generally cylindrical shank 6 of the bolt extending beyond the metal member 3 has applied thereto a fastener or nut 7, which nut, when screwed tight on the desirably threaded end 8 of the shank, as indicated, or otherwise connected thereto, forces the head 9, the outer surface of which is desirably convex or substantially flat, into the wood 2 until it is substantially or nearly flush with the outer surface of said wood.

In order to make an air- and water-tight joint with the wood 2 adjacent the point where the bolt shank 6 emerges from said wood, I form a sealing enlargement or pressure exerting bulge 10 on the shank 6. The enlargement or bulge may be spaced from the head 9 such a distance that it seals the end of the bolt-hole 4 adjacent the point where the shank emerges from the wood, or seals the end of said bolt-hole opposite to that adjacent the head 9.

The surface of the bulge or enlarged sealing portion 10 adjacent the threaded portion of the shank or opposite the head 9 is preferably tapered to a greater diameter toward the head or formed frusto-conical for the greater portion of its length, as indicated at 11, so that as the bolt is forced into the wood, the bolt-hole for which is desirably formed of a diameter corresponding with that of the normal or cylindrical portion 6 of the bolt shank, a graduated pressure is set up tending to avoid any splitting action on the wood which would develop through expanding the diameter of the bolt-hole. In the embodiment illustrated, the hole contracts to some extent behind the sealing bulge as it passes to the final position illustrated in Figure 1, so that the portion of maximum diameter or extreme surface thereof is embedded in the wood to form an efficient seal, as shown most clearly in Figure 1.

The upper surface of the pressure ring, or that toward the head 9 of the bolt, is desirably formed substantially spherical, as indicated at 12, so that the same shaped contour or contact face is presented to the wood or sides of the bolt-hole even if the bolt shifts on account of movement of the parts which are held thereby. In other words, any movement which would rock the bolt in the wood would still present the same curved surfaces of the pressure ring to the contact sides of the wood and preserve the seal at all times.

The bolt head may be of any desired character, but the illustrated embodiment is of a modified octagonal shape. The head shown is formed on the lower surface, or that from which the shank extends, on four sides with rib portions preferably having cutting edges 13, so that when driven or otherwise forced into place the head will cut its way into the wood, the cutting edges permitting it to be hammered in position flush, or substantially flush, with the surface without mashing in the wood fibers and turning up splinters. The sharp lower edge 13 of the head ribbed portion is shown as projecting below the plane of juncture of the head and fillet, or beyond said plane toward the threaded end portion of the bolt. When so sunk in the wood, these cutting edges hold the bolt securely against turning and permit the tightening of the nut 7 on the other side of said bolt. The under surface of the bolt head is desirably formed with a fillet 14, caused by enlarging the shank in diameter as it extends to the junction with the head 9, which sets up a wedge action at the upper or head end of the bolt-hole, supplemented by the corresponding wedge action of the preferably tapered cutting portions 13 along peripheral portions of the head, which resist radial displacement of the wood fibers in directions away from the shank of the bolt, thus compressing the wood fibers at that point where the wood surrounds the bolt shank and producing a moisture-proof seal adjacent the head of said bolt.

From the foregoing disclosure, it will be seen that I have devised a bolt which prevents the entrance of moisture into the bolt-hole from the end of the hole under the head and from the end of the bolt-hole opposite to the head, and adjacent the unheaded end which is desirably provided with means, such as threads, to cooperate with a fastener. It will also be seen that with the form of head disclosed, means for holding the bolt against turning are provided and the head is formed self-countersinking through the use of spurs or cutting edges, thereby eliminating the bending of the wood fibers with the consequent formation of splinters. Although each rib or cutting spur has been illustrated as non-circular or straight, I am not limited to the special form shown.

Although a preferred embodiment of my invention has been illustrated, it will be understood that modifications may be made within the spirit and scope of the appended claims.

I claim:—

1. A bolt provided with a shank threaded to receive a nut and having an annular bulge integral therewith and disposed adjacent the threaded portion for sealing the nut-engaging end of a bolt-receiving hole in wood.

2. A bolt adapted for use in wood and provided with a head and a screw-threaded end shank portion for engaging a nut, that portion of the shank adjacent said threaded portion having an annular bulge integral therewith for sealing the nut-engaging end of a bolt-receiving hole in wood, that portion of the bulge toward said head being substantially spherical, and that portion of the bulge adjacent said threaded portion being substantially conical.

3. A bolt adapted for use in wood and provided with a multi-sided head having axially extending cutting edges on a plurality of its sides terminating short of the corners and permitting it to be hammered into position substantially flush with the adjacent surface of the wood and then adapted to prevent turning of the bolt, and a shank having means at the unheaded end to cooperate with a fastener and an annular bulge integral therewith and spaced from said head for sealing a bolt-receiving hole in said wood.

4. In combination with a piece of wood having a bolt-receiving aperture, a bolt received in said aperture and formed with a head sealing one end thereof, and a bulge in the shank of said bolt sealing the other end of said aperture the unheaded end portion of said shank extending beyond said wood and provided with means to cooperate with a fastener.

5. In combination with a piece of wood having a bolt-receiving aperture, a bolt with a head and a shank disposed in said aperture, the free end of said shank extending beyond said wood and threaded to receive a nut, and a bulge on said shank sealing the end of said bolt-hole therearound adjacent the threaded portion.

6. A bolt having a head portion and a shank portion and adapted to be driven into a bolt-hole in a wooden member, the shank portion having an enlargement of greater diameter than said hole so as to press into the portions defining the hole when the bolt is driven in place, and, at the plane of juncture of the shank with the head, extending in lines curved toward the periphery of said head, and means carried by the bolt head for resisting displacement of wood fibers by said curved portion.

7. A bolt adapted to be driven into a bolt-hole in a wooden member and having a head portion and a shank portion, the shank portion having an enlargement of greater diameter than said hole so as to press into the portions defining the hole when the bolt is driven in place, and, at the plane of juncture of the shank with the head, extending in lines curved toward the periphery of said head, and a rib disposed on the undersurface of the head along a peripheral portion.

8. A bolt adapted to be driven into a bolt-hole in a wooden member and having a head and a shank, that portion of the shank remote from the head being threaded for connection with a nut, and a portion of the shank between its threaded portion and head being enlarged to a diameter greater than that of the hole so as to press into portions of said member defining said hole, the shank, at its plane of juncture with the head, extending in lines curved toward the periphery of said head, and means carried by said head for resisting displacement of wood fibers by said curved portion.

9. A bolt comprising a shank with a head at one end and adapted to seal a bolt-hole in wood when driven thereinto and be prevented from turning in said hole, said bolt for that purpose having a circumferential substantially frusto-conical shank enlargement and a non-circular rib disposed on the surface of the head, from which the shank extends, and at the plane of juncture of the shank with the head extending in lines curved toward the periphery of said head.

10. A bolt having a head portion and a shank portion and adapted to be driven into a bolt-hole in a wooden member, the shank portion having an enlargement of greater diameter than said hole so as to press into the portions defining the hole when the bolt is driven in place, and, at the plane of juncture of the shank with the head, extending in lines curved toward the periphery of said head, and the bolt head formed with sharp edge portions on its underside for resisting displacement of wood fibers by said curved portion.

11. A bolt adapted to be driven into a bolt hole in a wooden member and having a head and a shank, that portion of the shank remote from the head being threaded for connection with a nut, and a portion of the shank between its threaded portion and head gradually enlarging to a greater diameter toward the head so as to press into portions of said member defining said hole, said enlargement being substantially frusto-conical for the greater portion of its length, the shank, at its plane of juncture with the head, having a fillet causing the material thereof to extend in lines curved toward the periphery of said head, and said head being formed with sharp lower edge portions, projecting below the plane of juncture of head and fillet, for biting into the wood and compressing it around said filleted portion.

JOHN H. SHARP.